United States Patent [19]
Rands

[11] 3,779,591
[45] Dec. 18, 1973

[54] ENERGY ABSORBING DEVICE
[76] Inventor: William Partington Rands, 6983 Trolley Way, Los Angeles, Calif. 90291
[22] Filed: Aug. 23, 1971
[21] Appl. No.: 173,813

[52] U.S. Cl. ........................ 293/89, 293/1, 188/1 C
[51] Int. Cl. ........................................... B60r 19/00
[58] Field of Search ..................... 188/1 C; 213/1 A; 293/DIG. 3, 1, 70, 89

[56] References Cited
UNITED STATES PATENTS

| | | | |
|---|---|---|---|
| 3,670,852 | 6/1972 | Yarm | 188/1 C |
| 3,519,301 | 7/1970 | Somnitz | 293/1 |
| 3,428,150 | 2/1969 | Muspratt | 188/1 C |

FOREIGN PATENTS OR APPLICATIONS

| | | | |
|---|---|---|---|
| 905,836 | 9/1962 | Great Britain | 188/1 C |

*Primary Examiner*—Gerald M. Forlenza
*Assistant Examiner*—Robert Saifer
*Attorney*—Ronald W. Reagin et al.

[57] ABSTRACT

This invention relates to an energy absorbing device employed as the mounting supports in a safety bumper system with said device comprising an initial shaft member attached to the bumper and held in a sleeve fixture member mounted to the vehicle frame and said shaft sleeve combination having properties that soften the impact of collision by developing a resisting force as the shaft telescopes into the sleeve fixture wherein there occurs on the shaft member a mechanical cutting and deforming of longitudinal forms of surface material on the shaft member as said material is forced against abrupt cutting edges on the sleeve member. In a collision, said deforming process absorbs energy and transforms the force transmitted into the vehicle body from that of a sudden shock force into a controlled lesser force, thereby protecting the vehicle from damage in a low velocity collision and minimizing the jolt and rebound backlash experienced by the passengers. Further, the said deformation of material in the device is confined to separable elements fastened to the surface of the shaft member that permits the replacement of the damaged shaft portions and enables the restoration of the bumper to its original pre-collision condition for a relatively low cost.

2 Claims, 3 Drawing Figures

PATENTED DEC 18 1973

3,779,591

INVENTOR.
William P. Rands

ENERGY ABSORBING DEVICE

BACKGROUND OF INVENTION

Much of the damage experienced by vehicles in low velocity collisions is the result of the kinetic energy of the vehicle's motion being dissipated by the bending, tearing and shearing of the material that comprises the vehicle body and structure. An object of this invention is to protect the automobile body from such costly damage by controlling and localizing the material deformation to low cost replaceable elements within the bumper system. A second object of this invention is to improve passenger safety by the softening of the sudden shock of impact transmitted into the vehicle body and the elimination of vehicle rebound or spring back. The form of bumper that is fixed and of rigid construction may afford protection of the vehicle yet it transmits the sudden jolt of impact to the passengers. Other protective bumper systems having deflecting spring arrangements momentarily store energy as they deflect, then immediately release this energy with a rebounding force in the opposite direction subjecting passengers to a violent whiplash motion. In a type of safety bumper in which the collision energy is absorbed within the system there is the elimination of the sudden initial jolt experienced with ridgid bumpers and the elimination of the rebound spring back effect experienced with spring bumpers. Further, with an energy absorbing device in which material is permanently displaced and expended, it is desirable to have a means of easy replacement of that portion of the device that has been damaged. Also a self protecting feature is needed to prevent progressive deformation of material resulting from the many minor blows that occur during parking or normal maneuvering in close traffic.

DESCRIPTION OF INVENTION

The present invention is an energy absorbing device being that portion of a bumper system that supports and connects the bumper to the vehicle structure. The device consists of an initial rectangular shaft member attached at one end to the bumper and having the opposite end accommodated by a rectangular hole through a sleeve form included as a part of a holding fixture which is mounted to the vehicle structure. On certain surfaces of the shaft member are longitudinal ridges of material extending the length of the shaft from the bumper to the sleeve fixture. The face of said sleeve includes hardened, abrupt cutting edges that shear and deform the material on the shaft member when the shaft is forced through the holding fixture. In a collision this action results in an absorbing of the velocity energy and a softening of the impact shock transmitted into the vehicle body.

An additional feature important to this invention is the arrangement of the portions of the shaft members that are subject to the deforming action so as to provide an easy replacement of those portions at a low cost. The deformable longitudinal ridges on the rectangular shaft are formations on the surfaces of separable plates secured firmly to the surfaces of said shafts so as to become in effect one and the same as the shaft member. These plates are secured by flat headed screw fasteners set flush to the surface that allow the cutting edges to pass without interference. It is intended that these replaceable plate elements be provided in different modes to satisfy the many force requirements caused by the varied weights and vehicle protection needs and said mode difference being in the composition, number and size of material section being operated.

A further feature of this invention is the application of a shear or break-away pin common to the sleeve and the shaft that positions the bumper at a desired precollision position of readiness and said pin being of a size and of a material to shear or separate only when submitted to a force of a planned magnitude thereby protecting the deforming material from being unnecessarily expended by minor impacts that are not normally damaging to the vehicle.

After a collision the bumper system is serviced by the partial withdrawing of the bumper shaft assembly from the sleeve fixture back to the bumper's orignal position and installing new shear pins into the aligned shear pin holes. The damaged absorbing elements are then replaced with new elements thereby fully restoring the bumper system to its original pre-collision condition.

SUMMARY OF INVENTION

The safety bumper system presented contains telescoping shaft and sleeve devices connecting the bumper to the vehicle structure such that in a collision the device is compressed and a controlled cutting and deforming of longitudinal strips of material takes place resulting in the absorbing of energy. The kinetic energy of the vehicle's mass is transformed into mechanical work and in this way is absorbed and dissipated within the system. The mechanical work action being performed is the disarrangement of material on the surface of the shaft and said material having constant section in engagement with the cutting edges developes a resisting force that is relatively constant and uniform through the length of the planned bumper displacement stroke. In certain low velocity collisions, since the opposing resistance force is constant in nature, the vehicle will be brought to rest at a relatively uniform rate of deceleration. It is recognized that the system has its limits and in the event of greater collisions the system will soften the inital impact, but will not provide complete protection after the bumper has been fully depressed against the vehicle. The magnitude of the forces transmitted into the vehicle structure is controlled and does not exceed the amount of the planned reaction force that is developed by the displacement of the absorbing material on the shaft and that amount required to shear the holding pin.

The imput to the bumper system at the point of collision contact is an impact shock of a high force and very short duration having the character of a spike shaped pulse when viewed as a force vs. time curve. The output of the system into the vehicle structure as transformed by the energy absorbing device is a force of lesser magnitude having a longer duration and having the character of a trapazoid shaped pulse when viewed as a force vs. time curve. The time durarion of the output force pulse is the time period of the bumper displacement stroke as the absorbing shaft is forced through the cutting sleeve.

DESCRIPTION OF DRAWINGS

An understanding of the present energy absorbing device as employed in a protective bumper system is gained by reference to the accompanying drawings.

In FIG. 1 a bumper 1 is supported and extended from a vehicle frame structure 2 to which an energy absorbing shaft 3 is secured, as by bolts 6. Said shaft 3 is held by a sleeve fixture 4 which is secured by bolts 5 to the vehicle frame 2. In FIG. 2 the energy absorbing shaft 3 includes a support shaft 10, which is shown in this embodiment with a mounting base 8 having holes 9 used for bolting the shaft member 3 to the bumper (not shown in FIG. 2). The shaft 3 includes replaceable plates 11 which are secured to the support shaft 10 with flush headed screws 16 through clearance holes 15 into threaded holes 13 securing the plates 11 firmly to the body surface 14 of the support shaft 10. The surface of plate 11 includes a pair of longitudinal ridges 12. A holding fixture 18 is mounted to the vehicle frame 7 by bolts 21 through a mounting flange 19. A through opening 20 in sleeve 18 recieves support shaft 10 and abrupt hardened edges 24 at the facing edge of the sleeve 18 serve as cutters that shear and deform the ridges 12 from the plates 11 when the energy absorbing shaft 3 is forced through the sleeve 18. The shaft 3 is secured in a ready position in the sleeve 18 by the holding pin 22 inserted through the aligned holes 23 in the sleeve 18 and 17 in the shaft 10, said pin 22 being of a size and material to shear at the lines of interface should an impact of a predetermined force operate the bumper. In FIG. 3 the absorbing device of FIG. 2 is shown in a mid-defection stroke with the deformed material ridges 12 curling away at 39 from the surface of the replaceable elements 11 which are secured by flush screws 16 to the support shaft 10 that is being forced through the sleeve 18 past the hardened abrupt cutting edges 24 in the direction shown by arrows 42 as the bumper 1 is subjected to the collision forces represented by the arrow heads 41. The end of the support shaft 10 that is toward the bumper 1 incorporates a mounting plate 8 that is bolted to the bumper 1 with threaded studs 34 and nuts 35. The sleeve 18 is shown having a mounting flange 19 being secured to the vehicle frame 2 by bolts 21. The holding pin 22 of FIG. 2 that is common to the shaft member 10 and the sleeve member 18 is shown sheared with the separated pieces 32 and 33 still retained in the holes in the sleeve and shaft members respectively.

Figure 1:
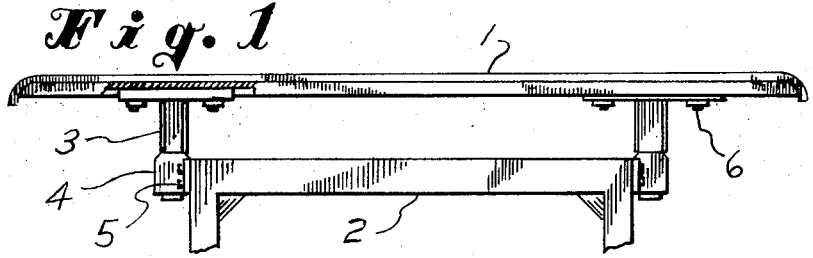
FIG. 1 is a top plan view of a bumper supported by a pair of energy absorbing devices mounted to a vehicle frame.
Figure 2:
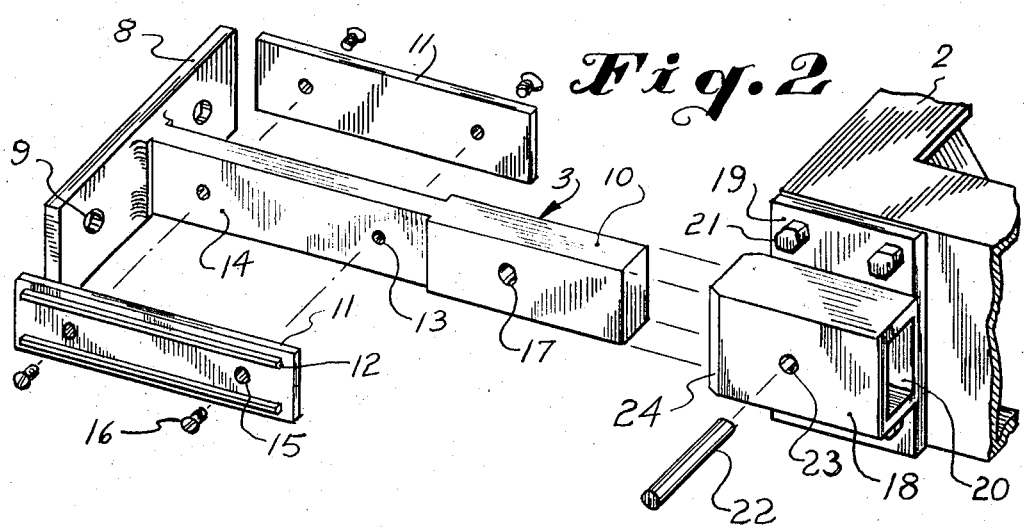
FIG. 2 is an enlarged exploded prespective view of an absorbing shaft and cutting sleeve mounting fixture.
Figure 3:
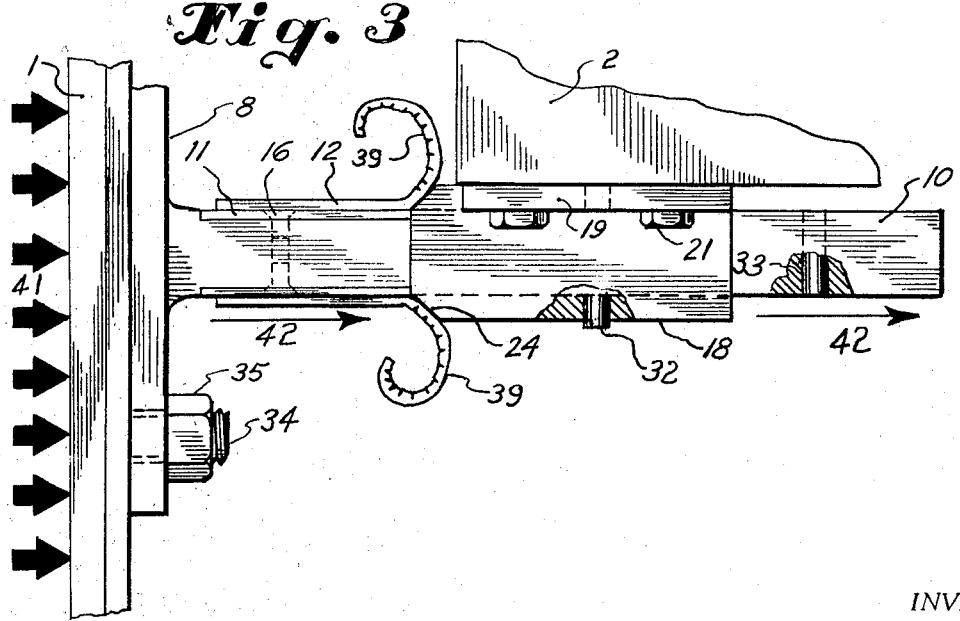
FIG. 3 is an enlarged top view during collision showing the absorbing shaft being thrust through the sleeve of the holding fixture and material being displaced from the shaft surface.

The present invention described in detail and shown in the drawings is both a prefered embodiment of the absorbing device employed as a part of a safety bumper system and is also considered an example of the principle of the invention. It is understood that there are other shaft and cutter embodiments possible that involve the removing or gouging of longitudinal forms of material as one member is forced to pass through the other member, however the significant principle set forth in this specification is the energy absorbing properties of a device in which there takes place a constant disarrangement of material thereby developing a constant force of resistance.

It is to be understood also that this energy absorbing invention is not limited to vehicle protective bumpers but may be employed in bumper systems on fixed structures as well as moving objects for the purpose of impact softening and damage prevention. This energy absorbing method is employable in any systems or units requiring the impact softening of a velocity body in collision. Included is the dropping of objects from air craft to the ground, the impacting with the ground of objects launched into the air, and the hard landing of space capsules and vehicles in connection with planetary exploration. A still further use of this energy absorbing invention is as a safety feature in hoisting and lifting equipment to lessen the impact of falls resulting from equipment failures. A further application is as a load limiter used in either tension or compression as a link to prevent inadvertent shock loads from being transfered into a system thereby protecting a system from excessive stresses.

I claim:

1. An energy absorbing device for use in a safety bumper system, or the like, comprising, in combination:

an energy absorbing shaft member including at least one longitudinally extending ridge of material which can, upon application of sufficient force, be sheared from said shaft member, said shaft member comprising a mounting base and at least one plate which is removably secured to said mounting base, and in which said longitudinally extending ridge forms part of said plate, a sleeve member including a cutting edge, and means for positioning said shaft member within said sleeve member in such a manner that said cutting edge can contact said longitudinally extending ridge, whereby, upon application of sufficient force to said energy absorbing device, said shaft member is driven into said sleeve member and said cutting edge shears said longitudinally extending ridge from said shaft member, thereby absorbing and dissipating the energy in the applied force.

2. The invention of claim 1 which further comprises means for securing one of said shaft members and sleeve member to a vehicle frame and the other of said shaft member and sleeve member to a bumper on a vehicle.

* * * * *